(12) United States Patent
Thomsen et al.

(10) Patent No.: US 11,243,910 B2
(45) Date of Patent: Feb. 8, 2022

(54) INDEXING DOCUMENTS IN A NESTED HIERARCHY OF DIRECTORIES

(71) Applicant: Uber Technologies, Inc., San Francisco, CA (US)

(72) Inventors: Jakob Holdgaard Thomsen, Risskov (DK); Rene Wenzel Schmidt, Risskov (DK); Joakim Recht, Aarhus (DK); Zura Kutsia, Mountain View, CA (US); Alexey Pavlenko, Vilnius (LT)

(73) Assignee: Uber Technologies, Inc., San Francisco, CA (US)

( * ) Notice: Subject to any disclaimer, the term of this patent is extended or adjusted under 35 U.S.C. 154(b) by 212 days.

(21) Appl. No.: 16/544,379

(22) Filed: Aug. 19, 2019

(65) Prior Publication Data

US 2021/0056075 A1 Feb. 25, 2021

(51) Int. Cl.
*G06F 16/00* (2019.01)
*G06F 16/13* (2019.01)
*G06F 16/93* (2019.01)
*G06F 16/14* (2019.01)
*G06F 16/185* (2019.01)

(52) U.S. Cl.
CPC .......... *G06F 16/137* (2019.01); *G06F 16/152* (2019.01); *G06F 16/185* (2019.01); *G06F 16/93* (2019.01)

(58) Field of Classification Search
CPC ...... G06F 16/137; G06F 16/93; G06F 16/152; G06F 16/185
See application file for complete search history.

(56) References Cited

U.S. PATENT DOCUMENTS

| | | | |
|---|---|---|---|
| 10,152,530 B1 * | 12/2018 | Hart | G06F 16/284 |
| 2004/0143564 A1 * | 7/2004 | Gross | G06F 16/2428 |
| 2007/0055680 A1 * | 3/2007 | Statchuk | G06F 16/367 |
| 2007/0299806 A1 * | 12/2007 | Bardsley | G06F 16/164 |
| 2009/0287702 A1 * | 11/2009 | Pascucci | G06F 16/51 |
| 2014/0040714 A1 * | 2/2014 | Siegel | G06F 16/93 |
| | | | 715/203 |
| 2020/0242159 A1 * | 7/2020 | Dain | G06F 11/3034 |
| 2020/0371992 A1 * | 11/2020 | Alayli | G06F 16/182 |

* cited by examiner

*Primary Examiner* — Tyler J Torgrimson
(74) *Attorney, Agent, or Firm* — Fenwick & West LLP

(57) ABSTRACT

An online storage system receives a plurality of documents to be stored in a directory. The storage system stores document data from each document in a document database. The storage system generates an entry for each document in an entry table and indexes the documents stored in the directory. The storage system samples a subset of the plurality of documents assigned to the directory in a directory index to determine a sampled subset of the plurality of documents. The storage system indexes the sampled subset in a directory index. The storage system can receive a request, from a client device, to view the indexed documents in the directory. Responsive to the request, the storage system presents the indexed documents in the directory retrieved from the directory index.

20 Claims, 5 Drawing Sheets

501

Receive a request for document data for a document stored in a directory
510

↓

Identify the entry corresponding to the document from the entry table
520

↓

Retrieve document data from the document database
530

502

Receive a request to view indexed documents in a directory
540

↓

Present the indices in the directory from the directory index
550

503

Receive a request to view one or more documents in a directory, wherein at least one of the requested documents is not indexed
560

↓

Scan entry table for requested documents in the directory
570

↓

Present the requested documents in the directory
580

FIG. 5

INDEXING DOCUMENTS IN A NESTED HIERARCHY OF DIRECTORIES

BACKGROUND

This present disclosure generally relates to a document storage architecture for computer-based databases and more specifically to indexing documents in schema-less databases for efficient access.

Traditional computer-based databases are defined with a database schema. The schema defines the table, i.e., relationship between various entities, and any constraints on values for the various entities. A metadata database stores the properties of the schema. Physical storage mediums store the populated data values in the schema-defined tables. These traditional databases with defined schemas are rigid, and are only able to store data according to the manner in which the table is defined. Moreover, these traditional databases are limited in their ability to scale as the defined architecture of data values stored in the physical storage mediums would also require redefinition.

Other traditional databases store documents using a directory structure. Such databases use indices to map documents to their parent directories. However, some applications may store a very large number of documents in a single directory, thereby causing the structure representing the directory to become very large. These systems fail to efficiently store or access such large index structures.

SUMMARY

An online storage system stores and indexes documents. The storage system receives documents to be stored in various directories of a nested hierarchy of directories. The storage system stores document data from each document in a document database. The storage system may hash the document name or identifier with a hash function and, optionally, a key. The storage system generates an entry for each document in an entry table, where each entry comprises one or more metadata properties including a name of the corresponding document (potentially in a hashed form) and a label of the directory. Each entry may additionally comprise location information describing where the document data is stored in the document database. The storage system indexes documents stored in each directory according to a set indexing policy for the directory. In one example, according to one indexing policy, the storage system indexes a sampled subset of the documents not already indexed. Indexing documents can include generating an index identifying the indexed document, where the index is assigned to the directory in a directory index. According to another indexing policy, the storage system indexes documents until an index capacity is reached. According to yet another indexing policy, the storage system does not index documents. The storage system stores the entry table and the directory index in a metadata database that is separate from the document database. The indices for a given directory are stored on a single storage node in the metadata database, thereby allowing quick access and retrieval.

In an embodiment, the storage system processes a request, from a client device, to access the indexed documents in the directory. Responsive to the request, the storage system presents the indexed documents in the directory retrieved from the directory index.

In another embodiment, the storage system processes another request, from the client device, to access some or all documents in the directory including at least one document not indexed. Responsive to the request, the storage system identifies the entries corresponding to the requested documents by scanning the entry table. The storage system may send the requested documents for presentation.

The storage system can also process another request, from the client device, to view document data for a document stored by the storage system. The storage system finds the entry in the entry table corresponding to the requested document. The storage system uses location information in the entry to retrieve the document data from the document database.

BRIEF DESCRIPTION OF THE DRAWINGS

FIG. 5 illustrates process flowcharts for retrieving information on one or more documents, in accordance with one or more embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
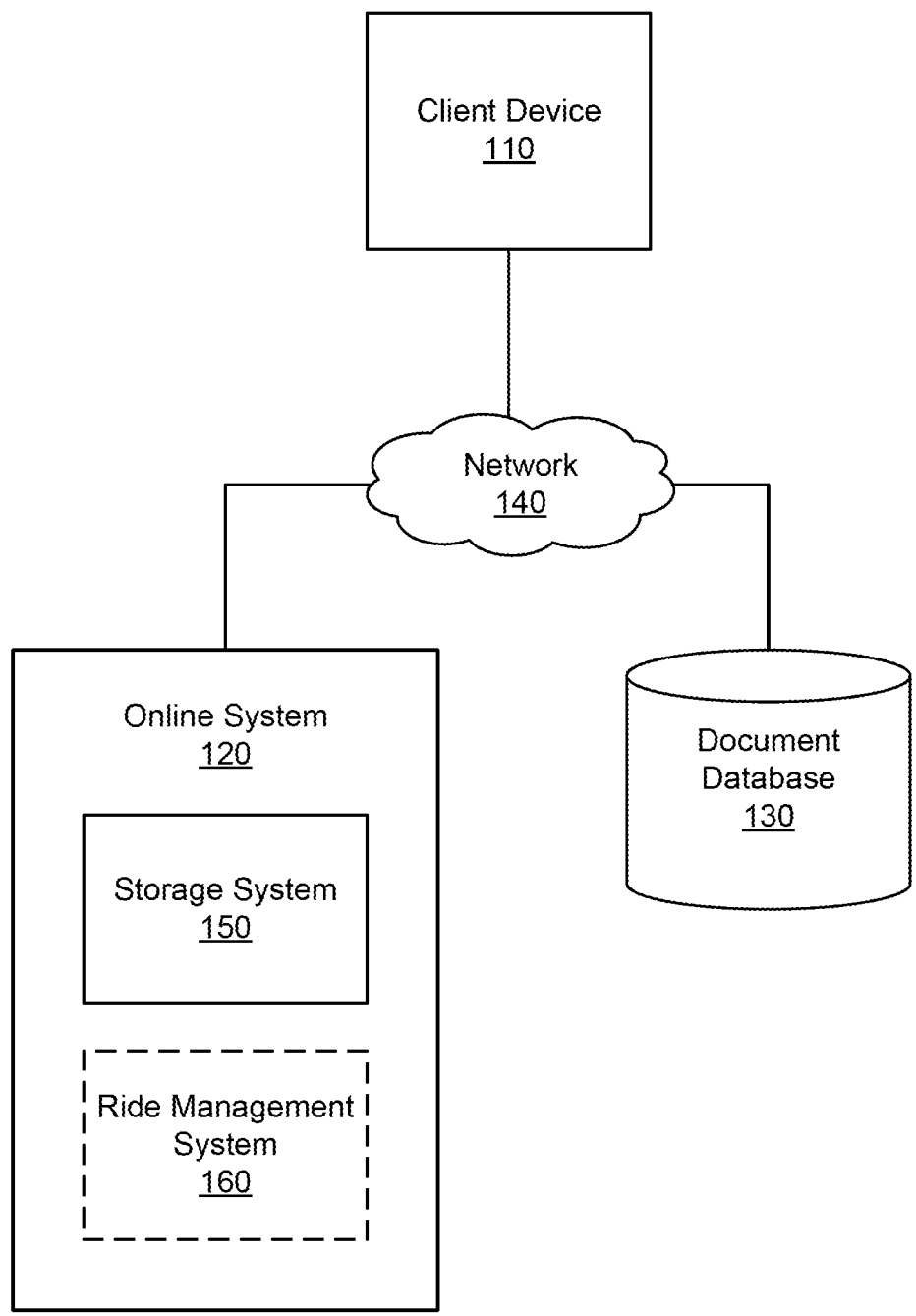
FIG. 1 illustrates a networking environment for an online storage system, in accordance with one or more embodiments.

FIG. 1 illustrates networking environment for an online storage system, in accordance with one or more embodiments. FIG. 1 includes a client device 110, an online system 120, a document database 130, and a network 140. The online system 120 includes a storage system 150 that stores documents obtained by the online system 120. In some embodiments, the online system 120 is a transport service system that connects riders and drivers for ridesharing transactions. The online system 120, in these embodiments, may also include a ride management system 160 that manages one or more aspects of the ridesharing transactions. For clarity, only one client device 110 is shown in FIG. 1, but in reality, multiple client devices 110 may communicate with any component over the network 140. Alternate embodiments of the system environment 100 can have any number online systems 120 and document databases 130. The functions performed by the various entities of FIG. 1 may also vary in different embodiments.

Users interact with the online system 120 through the client device 110. The client device 110 can be personal or mobile computing devices, such as smartphones, tablets, or notebook computers. The client device 110 may interact with the online system 120 through client applications configured to interact with the online system 120. Interactions include at least providing documents to the online system 120, providing instructions regarding storage of the documents by the online system 120, viewing documents stored by the online system 120, accessing documents stored by the online system 120, other interactions for document management, or any combination thereof. Documents that are provided to the online system 120 may include text documents, spreadsheets, photos, videos, other file types, or any combination thereof.

In embodiments of the online system 120 as a transport service system, users and drivers may interact with the client applications of the client devices 110 to request and access information about rides arranged. The client applications can present information received from the transport service system on a user interface, such as a map of the geographic region, the estimated trip duration, and other information. Additionally, the client devices 110 may provide their location and other data to the transport service system. For example, a current location of a client device 110 may be designated by a user or driver or detected using a location sensor of the client device (e.g., a global positioning system (GPS) receiver) and provided to the transport service system as coordinates. Some or all of the information—i.e., as documents—regarding the ridesharing transactions may be provided to the online system 120 for storage.

The online system 120 stores documents, e.g., via the storage system 150. The storage system 150 obtains documents, e.g., from one or more client devices 110, to be stored. The storage system 150 generates an entry in an entry table for each document, wherein the entry table is stored in a metadata database. The entry may include a name of the document (or other unique identifier of the document), a directory where the document is stored in a nested hierarchy, and location information describing where the document data is stored in a document database 130. In the nested hierarchy, each directory is a node in the nested hierarchy and may hold other directories or documents. In some embodiments, the document data is encrypted for obscuration of the document data when stored in the document database 130. The online system 120 additionally maintains a directory index that lists none, some, or all of the documents that are stored under each directory in a nested hierarchy of directories. The directory index may also be stored in the metadata database.

The storage system 150 also processes requests for retrieval of stored documents, e.g., from one or more client devices 110. The request may request a listing of some or all of the documents stored under a directory. The request may, alternatively, request access to the document data for one or more documents. Responsive to a request, the storage system 150 may provide the requested information to the requesting client device 110.

When storing documents in a directory, the storage system 150 may employ one of multiple indexing policies for indexing the documents in the directory index. In one embodiment, the storage system 150 has three indexing policies, one of which may be set for each directory. In a first indexing policy, named "Enabled", the storage system 150 sets a capacity of indices for the directory. As documents are added into the directory, e.g., by a client device, the storage system 150 continues to index documents up until the capacity is reached, e.g., 100,000 indices. In variant manners, indices may be rewritten, for instance when more recent documents are received. In a second indexing policy, named "Disabled", the storage system 150 does not index all documents received. In one instance, none of the documents in a directory are indexed. In another instance, only documents selected by a user via a client device 110 are indexed. In a third indexing policy, named "Sampled" (also referred to as sampling-based policy), the storage system 150 periodically indexes a randomly sampled non-indexed document stored in the directory. The magnitude of sampling can be a parameter that is adjusted by a user via a client device 110. For example, the magnitude of sampling can be, e.g., 1, 2, 3, 4, 5, 6, 7, 8, 9, or 10 documents indexed a day. The periodicity of sampling can be another parameter adjusted by a user via a client device 110. In other example timescales, the periodicity of sampling can be, e.g., some number of documents indexed every minute, hour, day, week, month, so on and so forth. In some implementations, the sampling magnitude and periodicity are an upper bound as to how many documents may be indexed in a timeframe. With the Sampled policy, the storage system 150 may continue indexing up until an index capacity, e.g., 100,000 indices.

In some embodiments, a ride management system 160 manages rideshare transactions. In managing rideshare transactions, the ride management system 160 may implement various algorithms for connecting riders and drivers. Each trip (e.g., a transport service that is requested and/or completed) can be logged, e.g., recording a date of the trip, a time of the trip, route data for a route traveled, a rider identifier, a driver identifier, a calculated cost for the trip, payment received, discount codes used, any delays, any excess fees, any notes, ratings, other trip information, etc. The ride management system 160 may provide information for a trip all at once or as each piece of information is received or calculated.

The document database 130 stores the document data. The document database 130 receives document data from the online system 120, or more specifically the storage system 150. The document database 130 stores the actual data comprised in a document. In some embodiments, the document database 130 is a physical disk storage that comprises various components and subcomponents relating to physical disk storage. In other embodiments, the document database 130 is an online storage, e.g., an online cloud storage on a third-party online system. In still more embodiments, the document database 130 is storage space owned by the online system 120 variably located, e.g., an offsite building with units of disk storage. In any case, the document database 130 may be networked to the online system 120 or directly communicative with the online system 120.

The various components of the system environment 100 communicate via one or more network interfaces to communicate over the network 140. The network 140 comprises any combination of local area and wide area networks employing wired or wireless communication links. In some embodiments, all or some of the communication on the network 140 may be encrypted. For example, data encryption may be implemented in situations where the document database 130 is located on a third-party online system separate from the online system 120.

Storage System Architecture

Figure 2:
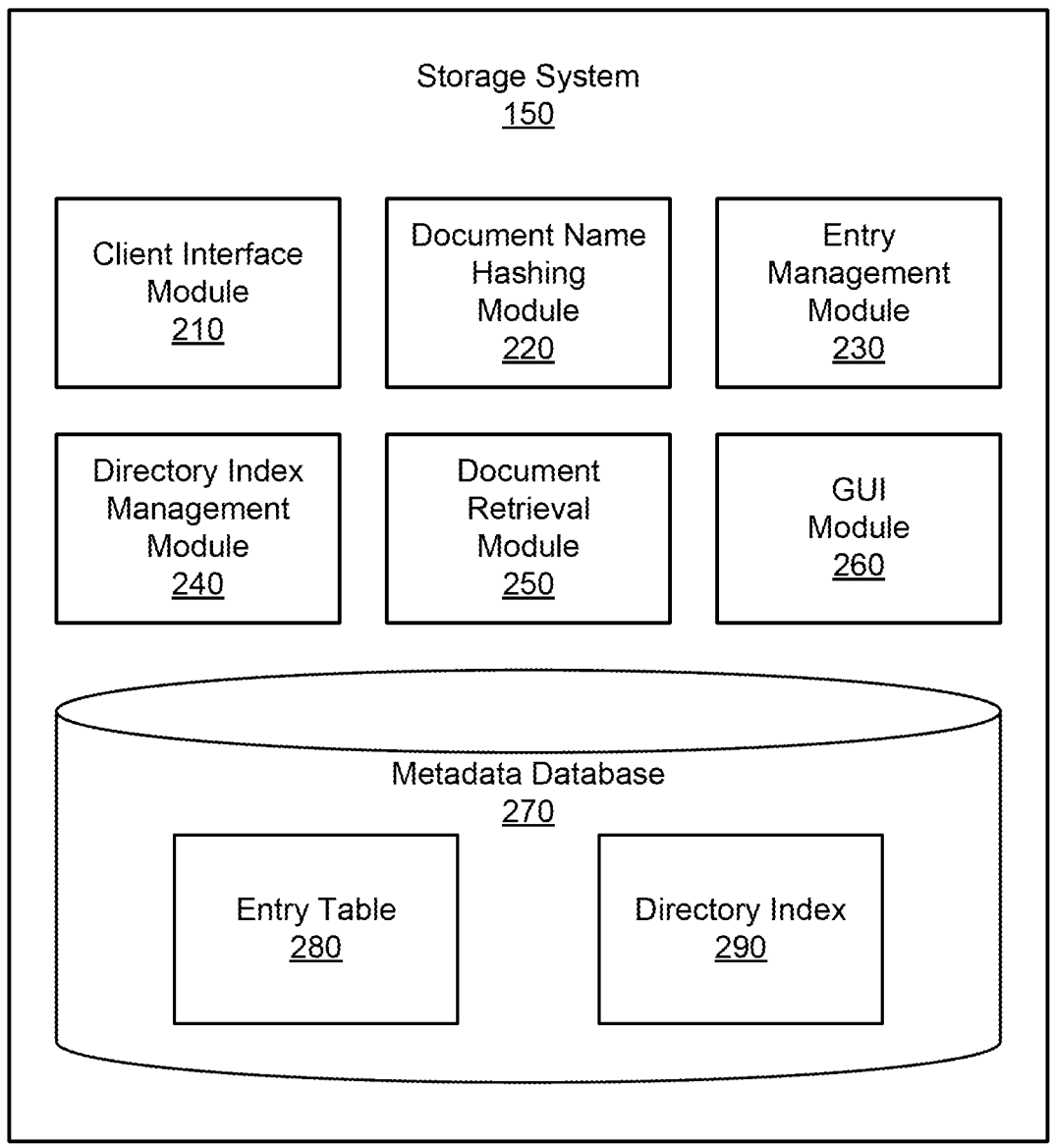
FIG. 2 illustrates an exemplary architecture of the online storage system, in accordance with one or more embodiments.

FIG. 2 illustrates an exemplary architecture of the online storage system 150, in accordance with one or more embodiments. The storage system 150 stores documents received by the online system 120. In addition, the storage system 150 may index stored documents for quick listing to a user of a client device 110. The storage system 150 also processes requests to access or view the documents. The storage system 150 has, among other components, a client interface module 210, a document name hashing module 220, an entry management module 230, a directory index management module 240, a document retrieval module 250, a graphical user interface (GUI) module 260, and a metadata database 270. Turning to the metadata database 270, the metadata database 270 maintains an entry table 280 and a directory index 290. In other embodiments, the storage system 150 has additional or fewer components than those listed herein. The functions and operations of the various modules may also be interchanged amongst the modules.

The client interface module 210 moderates communication between the online system 110 and one or more client devices 110. The client interface module 210 receives documents and responds to requests from the client device 110. The documents are typically provided by the client device 110 for storage by the storage system 150. As mentioned above, documents may be any computer-readable document of any various file type. The document may be named, comprise document data, and other metadata properties. In response to a client device 110 requesting access to documents, the client interface module 210 distributes requested information to the client device 110. In some instances, the information is presented in a GUI to the client device 110. The GUI may be generated or updated, e.g., by the GUI module 260.

The document name hashing module 220 hashes document names of documents. The document data for many documents can be randomly distributed via hashing of the document names and storing the document data under the hashed document names in varying locations in the document database 130. The hashing function is deterministic, i.e., there is a deterministic mapping of the document name to its hashed form. In some embodiments, the hashing function also requires a key that influences the hashing of the document name. Keys may be assigned to various directories. In the perspective of the document database 130, the received data is assigned (or stored under) a hashed document name. However, the storage system 150 can locate the document data knowing the hash function (and potentially the key) that can determine the hashed form of the document name.

The entry management module 230 manages entries in the entry table 280. The entry management module 230 generates a new entry for each new document received for storage. The entries for the documents are stored in the entry table 280. Each entry includes, among other pieces of information, a name of the document in a hashed form, a directory where the corresponding document is stored, location information on where the document data is stored on the document database 130. In some embodiments, each entry stores just the metadata of a document (properties describing the document) and not the document data itself. In other embodiments, document data may be stored in the corresponding entry. The entry table 280 itself may be subdivided into smaller tables that are more easily accessible. When new versions of documents are provided to the storage system 150, the entry management module 230 may update the entry for that document in the entry table 280. Updating the entry might entail adjusting one or more values in the entry, adding values, removing values, etc. Alternatively, the entry management module 230 may generate a new entry for the update of the document and indicate an increased version number, and so on with subsequent updates.

The directory index management module 240 indexes one or more documents into the directory index 290. In a nested hierarchy of directories, documents may be stored in any of the directories. For any given directory, an indexing policy is set which dictates how documents under that directory are or are not indexed. Indexing entails generating an index for a document stored under a directory, wherein the index comprises the name of the document and is assigned to the directory. As a simple example, a given directory has documents "A", "B", and "C" stored under that directory. The directory index may store an index for none, some, or all of those documents. When a client device 110 requests to see which indexed documents are under a directory, the directory index management module 240 may identify those indexed and display the labels of those documents to the client device 110, e.g., via a GUI. Additionally, the index for documents in a directory may be linked to the corresponding entry in the entry table 270. In more embodiments, the index comprises additional information on the document, e.g., date, size, file type, another metadata, etc. In some embodiments, to quickly view the indexed documents, the indices for the documents in the directory index 290 are stored in proximity in the metadata database 270, which will be discussed in greater detail below.

When a directory is set on the Enabled policy, the directory index management module 240 indexes all documents that are received to be stored in that directory up until an index capacity is reached, e.g., 100,000 indices. In other implementations, the index capacity may be set to 1,000; 10,000; 50,000; 100,000; 200,000; 500,000; etc. As documents are received for storage under a directory, the directory index management module 240 checks whether the index capacity has already been reached. If so, none of the newly received documents are indexed. If not, the directory index management module 240 indexes the received documents until the index capacity is reached. In tangential implementations, the directory index management module 240 may re-index the directory when the index capacity is reached. The re-indexing may dictate indexing from the newest or oldest received documents in a directory, indexing from the biggest or smallest, and indexing a random selection of the documents in the directory, etc.

When a directory is set on the Disabled policy, the directory index management module 240 does not index any documents that are stored in that directory. However, there may arise exceptions. For example, the Disabled policy may allow for a client device 110 to indicate certain documents to be indexed in the directory while the default is that no document is indexed unless otherwise specified. In another example, the Disabled policy may allow for previously indexed documents to remain in the directory index 290, but no subsequently received document will be indexed.

When a directory is set on the Sampled policy, the directory index management module 240 indexes one or more randomly sampled documents stored in that directory. The magnitude of sampling can be a parameter that is adjusted by a user via a client device 110. For example, the magnitude of sampling can be, e.g., 1, 2, 3, 4, 5, 6, 7, 8, 9, or 10 documents indexed a day. The periodicity of sampling can be another parameter adjusted by a user via a client device 110. In other example timescales, the periodicity of sampling can be, e.g., some number of documents indexed every minute, hour, day, week, month, so on and so forth. At each period of the sampling periodicity, the index management module 240 randomly samples one or more documents (according to the magnitude of sampling) that are not already indexed and then indexes those randomly sampled documents.

The Sampled policy paces the indexing of documents. In cases when storing orders of documents larger than the index capacity of a directory, the Sampled policy avoids reaching the maximum index capacity quickly. Take for example a batch of a million documents that are stored onto a directory with index capacity of 100,000. If the directory is set to the Enabled policy, the index management module 240 will index 100,000 of the million documents and then no longer index any subsequent document stored in the directory. When a requesting user views the directory, the storage system 150 would list the 100,000 indexed documents hindering the user from quickly seeing anything else stored in the directory other than the initially indexed documents. If subsequent documents stored in the directory differ from the initial set, the list of 100,000 indexed documents is not representative of the aggregate of documents actually stored in the directory. With the Sampled policy, the index management module 240 indexes 1 document a day that is randomly sampled. As subsequent batches of documents come in, the Sampled policy continues to randomly sample from the aggregate of documents stored in the directory, thus being more representative of the aggregate. As a result, if a user accesses the directory the user receives documents that provide a relatively uniform distribution of documents over time rather than a set of documents received in a short time interval. For example, if the characteristics of the documents change over time, a user gets a more accurate description of the documents. For several applications, a user is interested in getting a general description of characteristics of documents rather than specific details of individual documents. Embodiments of the invention provide such information to the users.

The document retrieval module 250 retrieves information regarding the documents stored by the storage system 150. The document retrieval module 250 handles the requests from client devices 110 to view information on the documents stored. Once the information for documents are retrieved, the document retrieval module 250 may provide the requested information to the client device 110, e.g., via the client interface module 210. Moreover, the requested information may be formatted by the GUI module 260.

A first request type asks to retrieve document data for a document. The document name hashing module 220 hashes the document name corresponding to the requested document. With the hashed document name, the document retrieval module 250 identifies the entry corresponding to the document stored according to the hashed document name in the entry table 280. With the entry, the document retrieval module 250 can locate the document data in the document database 130.

A second type of request asks for to list indexed documents in a directory. Practically speaking, a client device 110 is navigating through the nested hierarchy of directories. As the client device 110 selects a directory, the indexed documents are presented to the client device 110. Responsive to a request of this type, the document retrieval module 250 identifies indexed documents in the directory index 290 under the directory. The document retrieval module 250 provides the indexed documents to the client device 110— optionally formatted by the GUI module 260. Due to the fact that indexed documents under a single directory are within the index capacity, the document retrieval module 250 may compile the list generally quicker than when scanning the entry table 280 for all documents stored in the single directory.

A third request type asks for a list of some or all documents listed in a directory. Responsive to this request type, the document retrieval module 250 scans the entry table 280 to identify the documents to be listed. In some embodiments, the document name hashing module 250 hashes all document names of the requested documents, the hashed form being used by the document retrieval module 250 to scan the entry table 280 for identifying the entries of the requested documents. This request type could specify all documents, or some documents, e.g., in some range of dates. For example, all trips for a transport service system are stored under one directory. A client device 110 may request a list of trips in January 2019. Accordingly, the document retrieval module 250 scans the entry table 280 and lists all trips with dates in January 2019. Typically this second request type takes longer given the potential enormity of directories, e.g., billions of documents in a directory. The document retrieval module 250 may designate an off-time of day (e.g., 2:00 AM-5:00 AM) to compile the list.

A fourth request type asks for metadata associated with a document. Responsive to this request type, the document retrieval module 250 scans the entry table 280 and identifies the document. In some embodiments, the document name hashing module 250 hashed the document name of the requested document which is used by the document retrieval module 250. The document retrieval module 250 retrieves the metadata in the entry corresponding to the requested document. This request type is useful for checking whether a document exists and/or for reading the metadata.

The GUI module 260 generates a GUI. The GUI can be provided to a client device 110 for presenting retrieved information on the documents stored by the storage system 150. When a client device 110 is communicating with the storage system 150, e.g., via the client interface module 210, the GUI module 260 generates a GUI presenting the nested hierarchy of directories. As the client device 110 navigates through the nested hierarchy, the GUI module 260 updates the GUI presented to the client device 110. While the client device 110 navigates through the directories, each directory viewed includes a third type of request for a list of indexed documents in the directory. The GUI module 260 receives the compiled list of indexed documents in the directory from the document retrieval module 250. Similarly, with other request types, the GUI module 260 may format the requested information in the GUI for presentation to the client device 110.

The metadata database 270 stores the entry table 280 and the directory index 290. The metadata database 270 may physically comprise physical disk storage capable of storing the metadata of the stored documents. The metadata is properties relating to the documents and includes at least the entry table 280 and the directory index 290, wherein both do not comprise the document data but properties of the documents. Storage space for the metadata database 270 can be divided into a number of shards, each shard mapped to one or more storage nodes. A cell is mapped to a shard based on the row key of the cell. Each shard is replicated to a configurable number of storage nodes. Collectively, these storage nodes form a storage cluster. The storage nodes store data in a manner that allows for fast single or multiple cell retrieval on the same storage node. Both the indices (or indexed documents) in the directory index 290 and the entries in the entry table 280 are stored on storage nodes of the metadata database 270.

In an embodiment, indexed documents in a directory are stored on the same storage node. As mentioned above, indexed documents in one directory are stored on the same storage node. When attempting to access the indexed documents, e.g., in response to a second request type, the document retrieval module 250 searches for the one storage node in the metadata database 270. In some implementations, the index capacity depends on the size of the storage node. In other embodiments, multiple directories of indices can be stored on a single storage node, etc.

Figure 3:
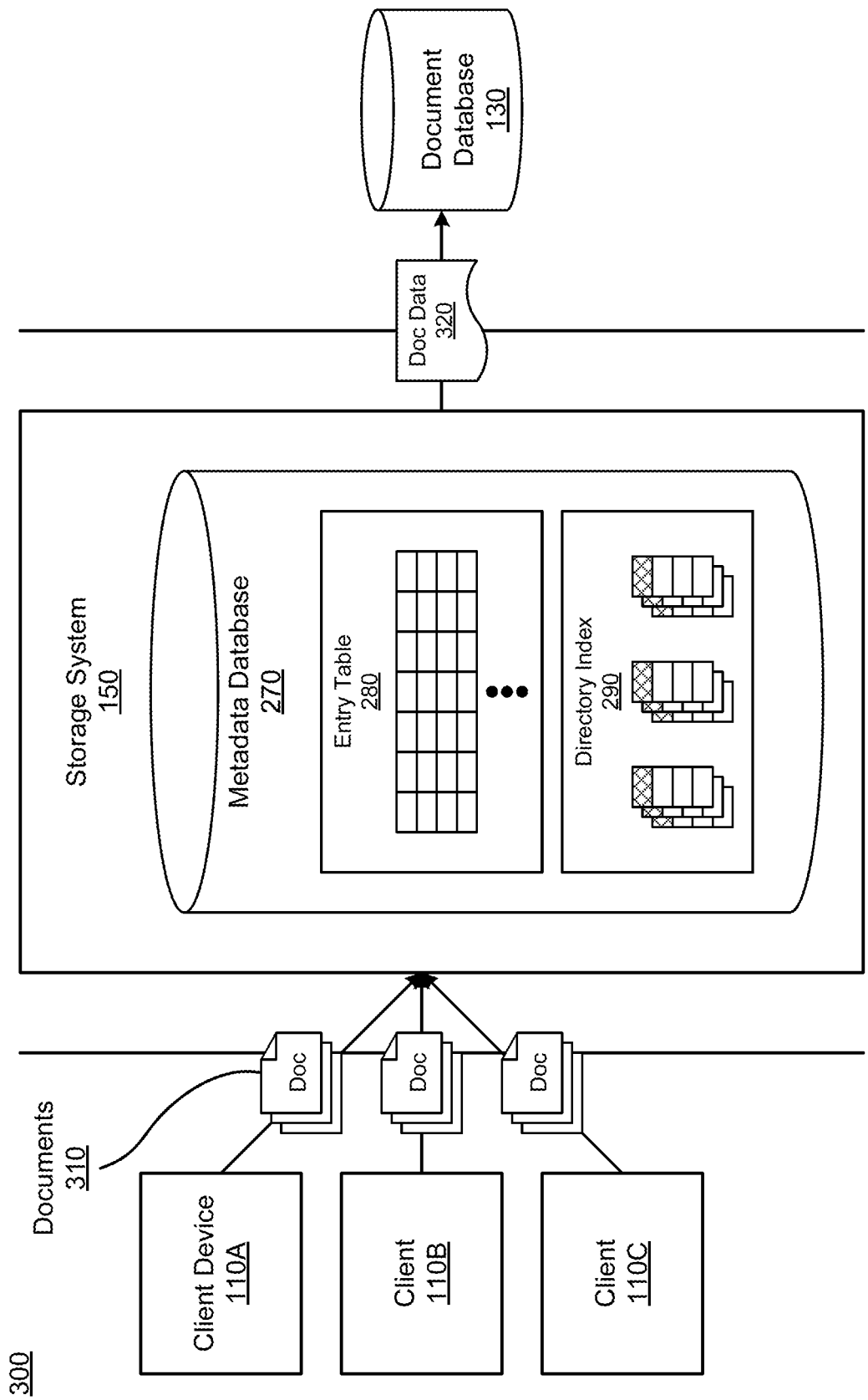
FIG. 3 illustrates a flow of documents when stored by the online storage system, in accordance with one or more embodiments.

FIG. 3 illustrates a flow 300 of documents when stored by the online storage system 150, in accordance with one or more embodiments. In this illustration, there are three client devices 110A, 110B, and 110C that are embodiments of the client device 110. The storage system 150 is a component of the online system 120.

The client devices 110A, 110B, and 110C provide documents to the storage system 150 for storage. The documents 310 may be provided in batches, wherein each batch may comprise any number of documents to be stored under a directory in the storage system 150. The storage system 150 receives the documents 310 and generates an entry in the entry table 280. An entry comprising information on each document 310 as metadata. According to the indexing policy set for a given directory, the storage system 150 indexes the documents according to the indexing policy, which is described above. In some embodiments, the indexed documents for any given directory are stored on a single storage node for quick access. The document data 320 of the documents are also provided to the document database 130. When a client requests information on a document, the storage system 150 may retrieve the requested information from the entry table 280, the directory index 290, the document database 130, or any combination thereof. The storage system 150 provides the retrieved information to one or more of the client devices 110A, 110B, and 110C.

Storing and Indexing Documents

Figure 4:
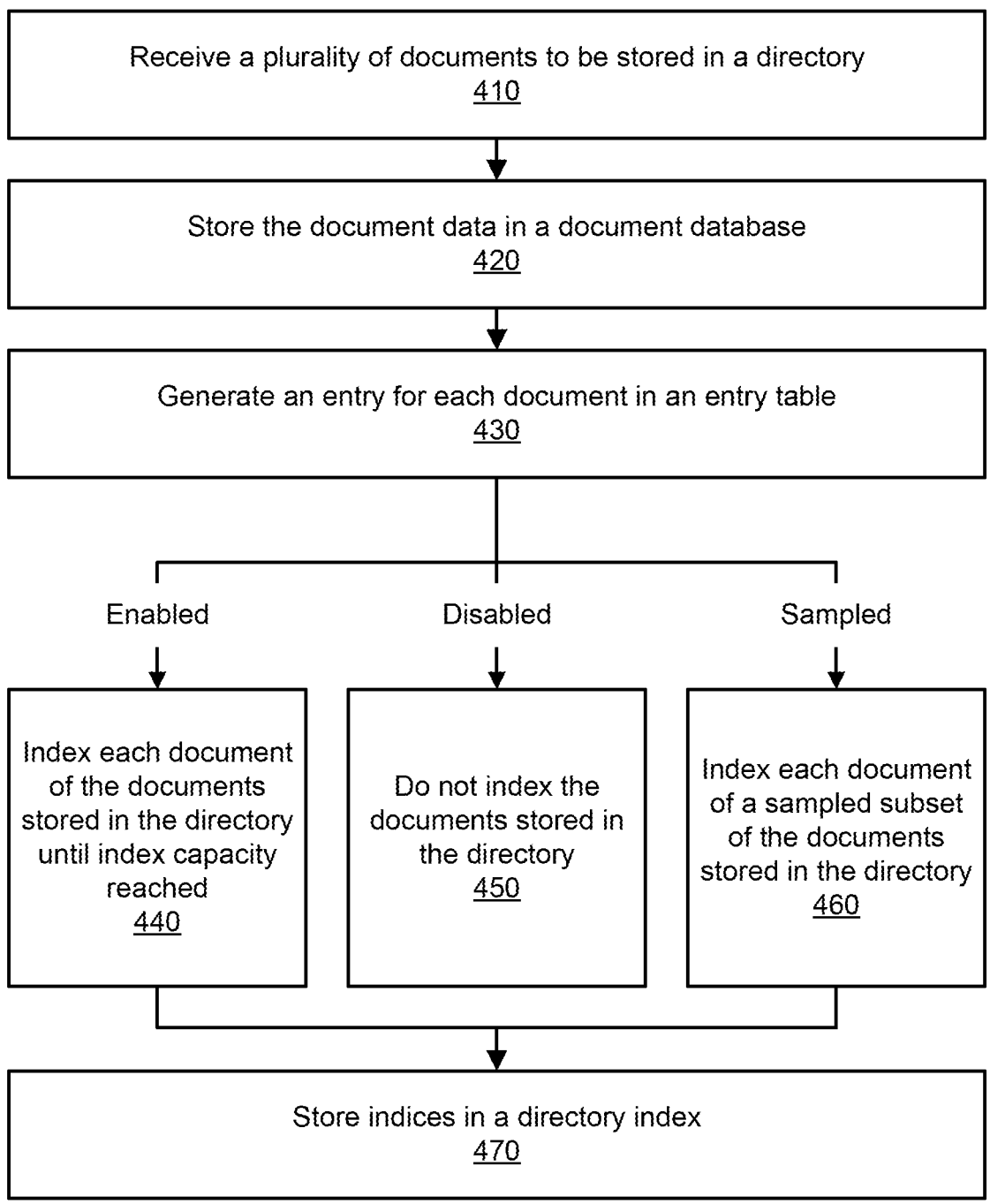
FIG. 4 illustrates a process flowchart for storing and indexing documents according to the one or more of the indexing policies, in accordance with one or more embodiments.

FIG. 4 illustrates a process flowchart 400 for storing and indexing documents according to one or more of the indexing policies, in accordance with one or more embodiments. The various indexing policies include, for example, the Enable policy, the Disabled policy, and the Sampled policy. The Enabled policy sets an index capacity for a number of indices (or indexed documents) per directory. The Disabled policy does not index any document in a directory. The Sampled policy randomly samples documents stored in a directory and periodically indexes the randomly sampled documents. The following steps are in the perspective of the storage system 150, but can be performed by the various modules in the storage system 150 shown in FIG. 2.

At step 410, the storage system 150 receives a plurality of documents to be stored in a directory (e.g., via the client interface module 210). The documents are received from a client device 110. Each document comprising document data to be stored by the storage system 150. In additional embodiments, each document can also comprise a name of the document, various properties of the document, etc. The directory where this plurality of documents is to be stored is part of a nested hierarchy of directories. In the nested hierarchy, each directory is a node in the nested hierarchy and may hold other directories or documents. Each directory has a particular indexing policy assigned, e.g., selected from the Enabled policy, the Disabled policy, and the Sampled policy. The indexing policy may be received as an input by the client device 110. Accordingly, the storage system 150 assigns the corresponding indexing policy to the directory.

At step 420, the storage system 150 stores the document data in a document database 130. At this juncture or later at step 430, the storage system 150 (e.g., via the document name hashing module 220) can optionally hash the document name for random distribution throughout the document database 130. To hash the document name, the storage system 150 uses a hash function and optionally a key to transform the document name into a hashed form. The document data is provided to the document database for storage 430 under the hashed form of the document name. In other embodiments, the storage system 150 can also process the document data prior to storage in the document database 130, e.g., via encryption.

At step 430, the storage system 150 generates an entry for each document in an entry table 280 (e.g., via the entry management module 230). Each entry includes, among potential other pieces of information, a name of the document (which may be in a hashed form), a directory where the corresponding document is stored in the nested hierarchy of directories, location information on where the document data is stored on the document database 130. Each entry stores just the metadata of a document (properties describing the document) and not the document data itself. The entry table 280 may be stored in a metadata database 270.

At this juncture, depending on an indexing policy assigned to the directory, the storage system 150 proceeds with indexing (e.g., via the directory index management module 240) according to the assigned policy. The options proceed in steps 440, 450, and 460 corresponding to the Enabled policy, the Disabled policy, and the Sampled policy, respectively.

At step 440, the storage system 150 indexes each document of the documents stored in the directory until index capacity is reached. As mentioned above, the index capacity may be also an adjustable parameter set by a user via a client device 110 for a particular directory. The index capacity limits indexing to within a set number. When considering whether to index a document, the storage system 150 checks whether the index capacity has been reached for the directory. If so, no further documents are indexed. If not, the storage system 150 indexes documents until the index capacity is reached. The order of indexing for the plurality of received documents can proceed according to any number of characteristics, e.g., size, name, date, etc.

At step 450, the storage system 150 does not index the documents stored in the directory. According to the Disabled policy, by default, no document is indexed. In some implementations, there may be exceptions where selected documents are indexed by the storage system 150.

At step 460, the storage system 150 indexes each document of a sampled subset of documents stored in the directory. Step 460 may occur periodically according to a periodicity of sampling. The size of the sampled subset may also be an adjustable parameter as a magnitude of sampling. Based on these two parameters, the storage system 150 randomly samples some number of documents in the directory not already indexed (according to the magnitude of sampling) every period (according to the periodicity of sampling). The storage system 150 continues to index until an index capacity is reached, in a similar principle to that of the Enabled policy.

At step 470, the storage system 150 stores the indices in a directory index 290. The directory index 290 may be located in the metadata database 270. When storing indices for documents stored in a directory, the storage system 150 may store the indices in a single storage node.

Document Retrieval

FIG. 5 illustrates process flowcharts for retrieving information on one or more documents, in accordance with one or more embodiments. Document retrieval generally refers to retrieving any type of information pertaining to documents stored by the storage system 150. Document retrieval may include retrieving document data for a document stored in the document database 130, attaining a list of indexed documents in a directory, attaining a list of documents (including at least one non-indexed document) in a directory, attaining another piece of information on one or more documents, or any combination thereof. The various requests may be from a client device 110, received by the client interface module 210, and handled by the document retrieval module 250 of the storage system 150, however, the following description is in the perspective of the storage system 150.

A first request type asks to retrieve document data for a document. A second type of request asks for to list indexed documents in a directory. A third request type asks for a list of some or all documents listed in a directory including at least one document not indexed.

In the first process flowchart 501, the storage system 150 responds to the first request type. In step 510, the storage system 150 receives the request for document data for a document stored in a directory. The storage system 150 identifies the entry corresponding to the document from the entry table 280. In some embodiments, the entries store the hashed form of document names. Accordingly, the storage system 150 hashes the document name of the requested document, the hashed form being used to identify the entry corresponding to the requested document. From the entry, the storage system 150 uses location information in the entry regarding where the document data is distributed in the document database 130. The storage system 150 retrieves the document data from the document database 130, e.g., for the requesting client device 110.

In the second process flowchart 502, the storage system 150 responds to the second request type. At step 540, the storage system 150 receives the request to view indexed documents in a directory. The storage system 150 identifies the storage node where the indices of the directory are stored in the directory index 290. Once identified, the storage system 150 may compile a list of some or all indexed documents responsive to the request. At step 550, the storage system 150 presents the indices in the directory, e.g., to the requesting client device 110.

In the third process flowchart 503, the storage system 150 responds to the third request type. At step 560, the storage system 150 receives the request to view one or more documents in a directory, wherein at least one of the requested documents is not indexed. The storage system 150 scans the entry table 280 for the requested documents in the directory. The storage system 150 can retrieve any piece of information in each of the entries corresponding to the requested documents. In one example, the requested information can simply be the name of the requested documents. In response to the third request type, the storage system 150 may process requests of this type during an off-time of day (e.g., 2:00 AM-5:00 AM). As an example, a single directory can store up to billions of documents. If all the billions of documents in a directory are requested, the storage system 150 may take significant amount of time (potentially on the scale of hours) to scan the entry table 280 to find the documents in the directory.

Following document retrieval, the storage system 150 may format the retrieved information for the requested documents, e.g., in a GUI generated by the GUI module 260. The storage system 150 presents the retrieved information to the client device 110.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   receiving a plurality of documents to be stored in a directory, the directory being a part of a nested hierarchy of directories;
   storing document data from each document of the plurality of documents in a document database;
   generating an entry for each document of the plurality of documents in an entry table, each entry comprising one or more metadata properties, the one or more metadata properties including (i) a name of the document and (ii) a label of the directory;
   sampling a subset of the plurality of documents assigned to the directory in a directory index to determine a sampled subset of the plurality of documents;
   indexing each document of the sampled subset in the directory index;

receiving a request, from a client device, to access the indexed documents in the directory; and responsive to the request, presenting the indexed documents in the directory from the directory index.

2. The method of claim 1, wherein the document database is an online cloud storage.

3. The method of claim 1, wherein the entry table and the directory index are stored in a metadata database that is separate from the document database.

4. The method of claim 3, wherein the indexed documents for the directory in the directory index are stored on a single storage node in the metadata database.

5. The method of claim 1, further comprising:
hashing a document name of each document with a hash function; and
wherein the entry for each document includes a hashed form of the document name.

6. The method of claim 1, wherein indexing each document comprises generating an index for the document, the index comprising the name of the document, wherein the index is assigned to the directory in the directory index.

7. The method of claim 1, wherein the sampled subset is randomly sampled from the plurality of documents.

8. The method of claim 1, wherein indexing each document of the sampled subset of the plurality of documents occurs periodically.

9. The method of claim 8, wherein indexing periodically comprises, per period:
determining whether a number of indices in the directory is under an index capacity;
responsive to determining that the number of indices is under the index capacity, sampling a number of documents stored in the directory not already indexed; and
indexing each of the sampled number of documents.

10. The method of claim 9, wherein, the period for indexing and the number of documents sampled are adjustable parameters.

11. The method of claim 1, further comprising:
receiving a second request to view one or more documents in the directory not indexed in the directory index;
responsive to the request, identifying the requested documents by scanning the entry table for the entries corresponding to the requested documents with the label of the directory; and
presenting the identified documents from the entry table.

12. The method of claim 1, wherein each entry additionally comprises location information describing where the document data is stored in the document database.

13. The method of claim 12, further comprising:
receiving a third request to view document data for one document of the plurality of documents stored in the directory;
responsive to the request, identifying the entry corresponding to the requested document;
retrieving the document data for the requested document from the document database based on the location information; and
presenting the document data retrieved from the document database.

14. A non-transitory computer-readable storage medium storing instructions that, when executed by a processor, cause the processor to perform steps comprising:
receiving a plurality of documents to be stored in a directory, the directory being a part of a nested hierarchy of directories;
storing document data from each document of the plurality of documents in a document database;
generating an entry for each document of the plurality of documents in an entry table, each entry comprising one or more metadata properties, the one or more metadata properties including (i) a name of the document and (ii) a label of the directory;
sampling a subset of the plurality of documents assigned to the directory in a directory index to determine a sampled subset of the plurality of documents;
indexing each document of the sampled subset in the directory index;
receiving a request, from a client device, to access the indexed documents in the directory; and
responsive to the request, presenting the indexed documents in the directory from the directory index.

15. The non-transitory computer-readable storage medium of claim 14, wherein indexing periodically comprises, per period:
determining whether a number of indices in the directory is under an index capacity;
responsive to determining that the number of indices is under the index capacity, sampling a number of documents stored in the directory not already indexed; and
indexing each of the sampled number of documents.

16. The non-transitory computer-readable storage medium of claim 14, wherein the instructions when executed by the processor, further cause the processor to perform steps comprising:
receiving a second request to view one or more documents in the directory not indexed in the directory index;
responsive to the request, identifying the requested documents by scanning the entry table for the entries corresponding to the requested documents with the label of the directory; and
presenting the identified documents from the entry table.

17. The non-transitory computer-readable storage medium of claim 14, wherein each entry additionally comprises location information describing where the document data is stored in the document database, wherein the instructions when executed by the processor, further cause the processor to perform steps comprising:
receiving a third request to view document data for one document of the plurality of documents stored in the directory;
responsive to the request, identifying the entry corresponding to the requested document;
retrieving the document data for the requested document from the document database based on the location information; and
presenting the document data retrieved from the document database.

18. A computer system comprising:
a processor; and
a non-transitory computer-readable storage medium storing instructions that, when executed by the processor, cause the processor to perform steps comprising:
receiving a plurality of documents to be stored in a directory, the directory being a part of a nested hierarchy of directories;
storing document data from each document of the plurality of documents in a document database;
generating an entry for each document of the plurality of documents in an entry table, each entry comprising one or more metadata properties, the one or more metadata properties including (i) a name of the document and (ii) a label of the directory;

sampling a subset of the plurality of documents assigned to the directory in a directory index to determine a sampled subset of the plurality of documents;

indexing each document of the sampled subset in the directory index;

receiving a request, from a client device, to access the indexed documents in the directory; and responsive to the request, presenting the indexed documents in the directory from the directory index.

19. The computer system of claim 18, wherein indexing periodically comprises, per period:

determining whether a number of indices in the directory is under an index capacity;

responsive to determining that the number of indices is under the index capacity, sampling a number of documents stored in the directory not already indexed; and indexing each of the sampled number of documents.

20. The computer system of claim 18, wherein the instructions when executed by the processor, further cause the processor to perform steps comprising:

receiving a second request to view one or more documents in the directory not indexed in the directory index;

responsive to the request, identifying the requested documents by scanning the entry table for the entries corresponding to the requested documents with the label of the directory; and presenting the identified documents from the entry table.

* * * * *